United States Patent
Schmidt et al.

(10) Patent No.: US 6,182,442 B1
(45) Date of Patent: Feb. 6, 2001

(54) COMBUSTION CHAMBER WALL CONSTRUCTION FOR HIGH POWER ENGINES AND THRUST NOZZLES

(75) Inventors: Guenther Schmidt, Taufkirchen; Steffen Beyer, Munich, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/244,927

(22) Filed: Feb. 4, 1999

(30) Foreign Application Priority Data

Feb. 4, 1998 (DE) .............................. 198 04 232

(51) Int. Cl.$^7$ ...................................... F02K 11/00
(52) U.S. Cl. ............................. 60/267; 239/127.3
(58) Field of Search .............. 60/257, 266, 267; 239/127.1, 127.3

(56) References Cited

U.S. PATENT DOCUMENTS

| | | | |
|---|---|---|---|
| 4,817,890 | * | 4/1989 | Coffinberry ................ 244/135 R X |
| 5,147,368 | * | 9/1992 | Boury et al. ................ 165/146 X |
| 5,899,060 | * | 5/1999 | Schmidt ................ 60/267 X |

FOREIGN PATENT DOCUMENTS

| | | |
|---|---|---|
| 3136252 | 3/1983 | (DE) . |
| 3535779 | 4/1987 | (DE) . |
| 4015204 | 10/1991 | (DE) . |
| 4115403 | 11/1992 | (DE) . |

* cited by examiner

Primary Examiner—Timothy S. Thorpe
Assistant Examiner—Ehud Gartenberg
(74) Attorney, Agent, or Firm—W. F. Fasse; W. G. Fasse

(57) ABSTRACT

A wall construction for a combustion chamber or thrust nozzle of a high power engine of a flying body includes an inner wall body that is subjected to the hot gases within the combustion chamber, and an outer jacket that surrounds the inner wall body and carries the mechanical loads. The inner wall body has a plurality of cooling channels through which a cooling medium may flow. The outer jacket is made of a long-fiber C/SiC composite material, while the inner wall member is made of a short fiber C/SiC composite material. The reduced thermal expansion coefficient of this ceramic composite material in comparison to metal alloys leads to a reduced straining and reduced deformation of the wall construction and therewith an increased operating life.

19 Claims, 2 Drawing Sheets

Fig. 3A (PRIOR ART)
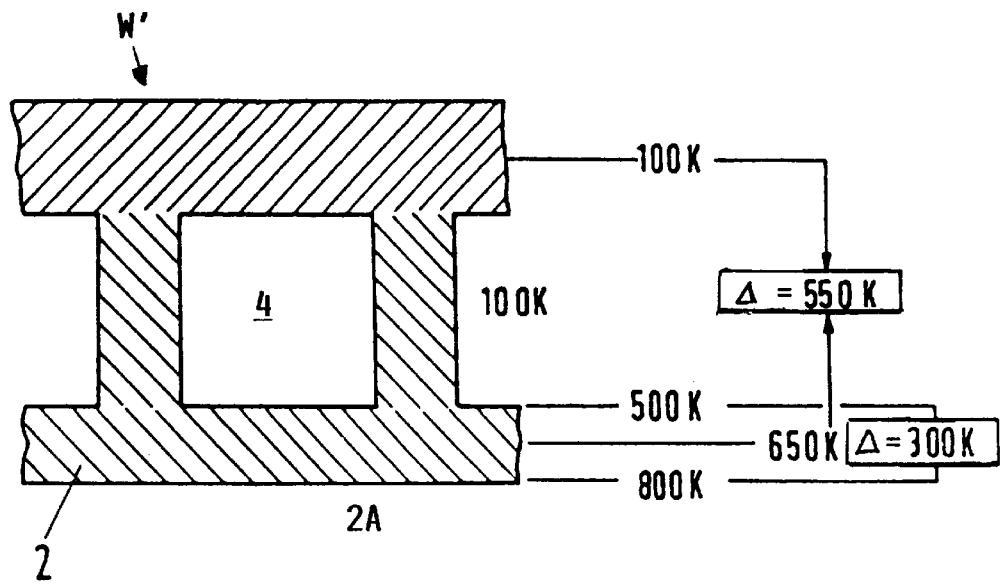
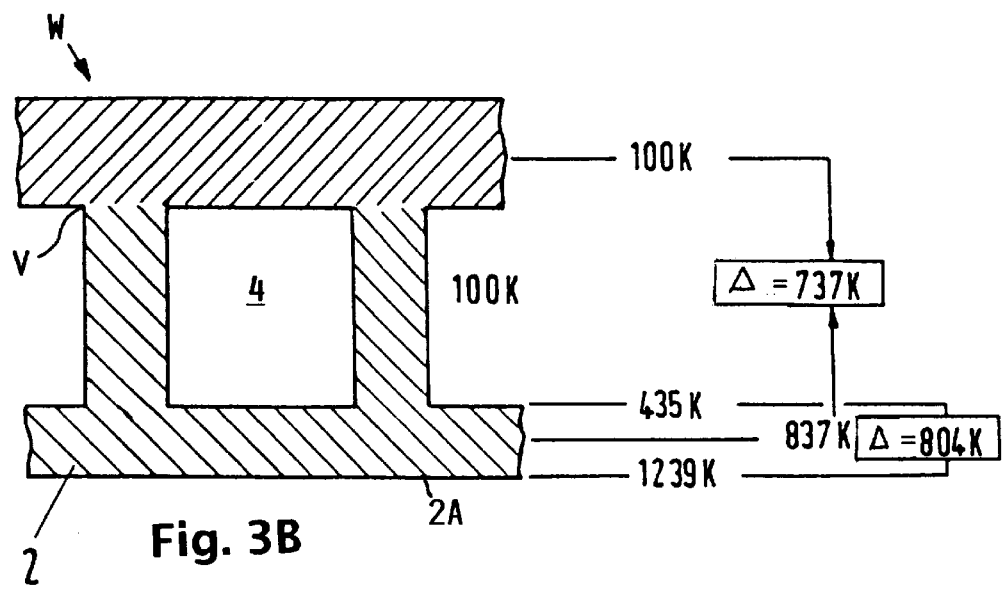
Fig. 3B
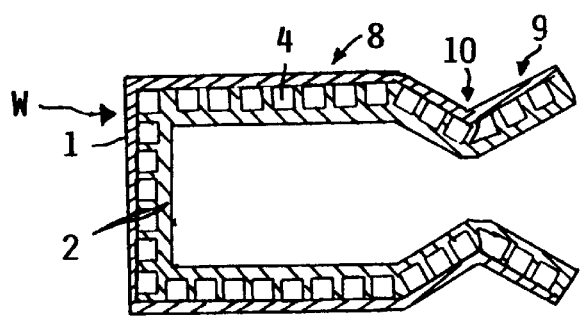
Fig. 4

COMBUSTION CHAMBER WALL CONSTRUCTION FOR HIGH POWER ENGINES AND THRUST NOZZLES

PRIORITY CLAIM

This application is based on and claims the priority under 35 U.S.C. §119 of German Patent application 198 04 232.9, filed on Feb. 4, 1998, the entire disclosure of which is incorporated herein by reference.

FIELD OF THE INVENTION

The invention relates to a wall construction of a combustion chamber and a thrust nozzle for a high power engine of a flying body, and especially a rocket. The wall construction includes an inner wall arranged in contact with the hot combustion gases of the engine, and an outer wall that withstands the gas pressure forces, whereby a plurality of cooling channels are provided in the inner wall.

BACKGROUND INFORMATION

German Patent Publication 3,535,779 discloses a thrust nozzle for a high power engine, for example for a booster rocket or a reusable spacecraft, which has a rotationally symmetric contour. The circular cross-section of the known thrust nozzle tapers or becomes narrower starting from the combustion chamber in a direction toward the constricted throat of the nozzle, whereafter it again expands or becomes wider outwardly. Such a known rotationally symmetric contour is simple to manufacture using known production technology and makes it possible to effectively withstand the arising gas pressure forces.

Due to the high operating temperatures of approximately 3000° C., it is in any event necessary that the thrust nozzle must be effectively cooled. In the conventional thrust nozzle, which comprises an inner casing or jacket made of a copper alloy, the necessary cooling is achieved by providing cooling channels extending in the circumferential direction or in the axial direction in the inner jacket. A cooling medium, such as the liquid hydrogen that is to be combusted in the combustion chamber or thrust nozzle, flows through the provided cooling channels and thereby cools the thrust nozzle. The conventional thrust nozzle further includes an outer support casing or jacket that externally surrounds the inner jacket in a joint-free manner, whereby this outer support jacket serves to take up and withstand the forces arising from the combustion gas pressure. For this purpose, the support jacket must comprise a high tensile strength, while its thermal resistance or temperature stability is of lesser importance due to the cooling that is provided.

Efforts are currently being pursued for developing hypersonic aircraft, which will similarly utilize such thrust nozzles. Due to weight, fuel capacity, and cost considerations, these thrust nozzles must achieve a high efficiency of thrust generation, whereby several engines are typically to be arranged clustered adjacent one another. In order to meet these requirements, there have already been proposals of thrust nozzles of which the cross-sectional contour transitions from a round cross-section in the area of the combustion chamber to a quadrilateral cross-section in the area of the exhaust outlet of the thrust nozzle or even in the area of the constricted throat of the thrust nozzle. Such a configuration in turn requires that the thrust nozzle wall has a complex curved contour.

On the one hand, the relatively soft inner jacket must have an inner contour exactly matching a prescribed shape in order to achieve an optimal combustion and gas throughflow. On the other hand, the outer supporting jacket must be sufficiently rigid and configurationally stiff for strength reasons. Therefore it becomes impossible to achieve a matching or adaptation of the outer jacket to the form of the inner jacket. As a result, it becomes necessary to manufacture the two jackets with a very high degree of matching shape accuracy, which necessitates the use of very complicated and costly production processes in view of the complicated geometry that is involved. A further disadvantage is that it is possible for hollow spaces or gaps to remain between the two jackets after they are joined together, whereupon these hollow spaces or gaps can lead to deformations, cracking and ultimately failure of the inner jacket during operation of the combustion chamber and thrust nozzle. As a result, the operating life of the rocket engine is limited.

To overcome the above discussed disadvantages, German Patent Publication 4,015,204 discloses a thrust nozzle for an aeronautic or aerospace engine comprising an inner casing or jacket that has a high thermal conductivity and that is provided with a plurality of cooling channels, a rigid and strong support casing or jacket externally surrounding the inner jacket, and an intermediate layer that is integrally cast in place between the inner jacket and the outer support jacket. In this manner, the intermediate layer serves to compensate for any production tolerance between the inner jacket and the outer support jacket so that the requirements of shape accuracy of the two jackets can be reduced.

German Patent Publication 4,115,403 discloses a thrust nozzle wall construction for expansion ramps and hot gas nozzles that comprises an outer supporting structure arranged facing away from the hot gas, as well as a multi-layered inner structure having a plurality of mutually spaced-apart cooling channels that run along the inner structure facing toward the hot gas that is present inside the nozzle. In order to achieve a high thrust output, and in order to simplify the exchangeability of the nozzles between different types of engines, thrust nozzles having a quadri-lateral configuration are particularly suitable. However, the nozzle walls of such thrust nozzles are subjected to high pressure forces and high temperatures. In contrast to the walls of circular cross-section nozzles, flat planar nozzle walls of quadrilateral nozzles or combustion chambers are subjected to high bending moments due to the pressure forces of the combustion gases. As a result, bulging or bending deformations and overstrain conditions can arise in the thrust nozzle walls, which jeopardize the proper functioning of the thrust nozzle according to specifications. An additional difficulty arises in view of the so-called bi-metal effect, due to the different metal components of the inner jacket and of the outer jacket and due to the temperature differences through the multi-layered wall. In order to avoid thrust losses and leakage flows, it is therefore necessary to provide very rigid, form-stable, cooled walls for the combustion chamber and the thrust nozzle.

For the above reason, this known thrust nozzle wall comprises an inner structure that consists of an inner thermal conduction layer that is impinged upon by the hot gas, as well as a heat resistant gliding layer. The required cooling channels are embedded in the thermal conduction layer, and these are elastically connected to the supporting structure by means of a plurality of holding elements that penetrate through the gliding layer. In this context, the gliding layer can consist of a ceramic granulate, while the thermal conduction layer consists of copper. The holding elements can be embodied in the form of small pipes or tubes. However, due to the required minimum strength in this context, an adequate straining distance is not available when the thrust nozzle is subjected to the extremely high thermal loading that is typical in the operation of high power engines. Due to the high thermally induced tensions, which cause considerable plastic strain deformation of these holding elements particularly, the operating life of the wall construction is drastically limited.

The above discussed limitation of the operating life is predominantly caused by a failure or defect formation, for example the formation of a crack in the combustion chamber wall, after a limited number of load cycles and associated plastic deformations and creeping of the components due to the thermally limited strains, in other words due to the secondary stresses caused by the high thermally induced stresses amounting to approximately 80% of the total load.

For the above reasons, not only is the reusability of the combustion chamber and thrust nozzle or overall engine system sharply limited, but also the total costs of the booster or other propulsion system are significantly increased. Moreover, thrust losses and overloading of the various engine components, including the known turbo-pumps for pumping the fuel, oxidizer, and/or coolant, also arise during operation of the engine, and, for example, lead to the formation of cracks or the like in these various components.

Even in the case if intermediate materials are arranged between the inner wall that is exposed to the hot gases and the outer supporting structure, such as sintered aluminum or foamed aluminum materials for example, which can take up and effectively absorb relatively high deformations, irreversible deformations in the plastic deformation range ultimately also arise, so that any such constructions are only suitable for single use engine concepts.

The above discussed support elements arranged between the inner hot gas wall and the outer surrounding structure, when made of conventionally known materials, are intended to achieve a defined yielding in the direction of their respective length as a result of associated widthwise or crosswise strain during operation of the high power engine. However, the known materials for making such supporting elements do not comprise an adequate elastic strain characteristic. As a result, the elastic strain required for the desired compensating effects during operation of the engine is not provided.

German Patent Publication 3,136,252 describes a ceramic combustion chamber wall for burner heads and combustion chambers, which are installed in combustion and drive plants or assemblies. In this context, the combustion chamber wall of the combustion space is an integrated component of a ceramic heat exchanger with single-stage or multi-stage flow channels. By means of strand pulling or extrusion techniques, film techniques, and winding or wrapping techniques, it is possible to produce such combustion chamber walls with parallel-flow, counter-flow, and/or cross-flow heat exchangers, as they are otherwise usually produced in metal embodiments. The use of silicon carbide or silicon nitride is suggested as the material for the combustion chamber wall.

SUMMARY OF THE INVENTION

In view of the above, it is an object of the present invention to provide a wall construction for a combustion chamber and for a thrust nozzle of a high power engine of a flying body, which exhibits a substantially increased operating life as compared to prior art wall constructions, so that it can withstand a high number of thermal loading cycles of the combustion chamber, with an improved reliability and functionality. It is a further object of the invention to provide such a wall construction that can be manufactured in a simple manner in any configuration required for a given engine design. The invention further aims to avoid or overcome the disadvantages of the prior art, and to achieve additional advantages, as apparent from the present specification.

The above objects have been achieved according to the invention in a wall construction for a combustion chamber or a thrust nozzle, especially of a high power engine of a flying body such as a rocket, wherein the wall construction comprises an inner wall body that faces the hot combustion gases within the combustion chamber or thrust nozzle and an outer casing or jacket arranged externally on the inner wall member. The inner wall member is configured with a plurality of cooling channels therein. The outer jacket comprises a long fibered C/Sic composite material, while the inner wall member comprises a short fibered C/SiC composite material. In other words, both the outer jacket and the inner wall member are made of a composite material of carbon fibers in a silicon carbide base or matrix. The silicon carbide material may be present in the form of crystals, grains, and/or fibers. Additional materials may be incorporated in the base or matrix material, or the matrix may consist essentially of the silicon carbide by itself. The silicon carbide may be formed on or impregnated into the fiber surfaces of the carbon fibers by reaction with silicon or a suitable silicate.

The carbon fibers of the outer jacket are known in the art as "long" fibers while the carbon fibers of the inner wall member are known in the art as "short" fibers. The long fibers are relatively longer than the short fibers on average. The term "fibers" used in this disclosure is intended to cover various elongated configurations, including fibers, whiskers, filaments, and the like.

The wall construction of the combustion chamber or thrust nozzle according to the invention achieves several advantages. Most importantly, the inventive wall construction achieves a high operating life in comparison to the prior art wall constructions. This is achieved especially because the C/SiC material used according to the invention has a low mass and a low plastic deformation due to its very low thermal expansion or strain coefficient, as compared to metal materials which are conventionally used for the walls of combustion chambers and nozzles, and which have a comparatively high mass, a high elastic deformation, and therewith a comparatively low or short operating life. Moreover, the use of the same or compatible C/SiC materials (with only different average fiber lengths) in the outer jacket and in the inner wall member avoids the problems associated with the bi-metallic effect as well as the matching of the shapes of the outer and inner components as described above. Also, superior integral bonding between the inner wall member and the outer jacket is achieved by using a C/SiC material for both components. The combination of different fiber lengths in the two components further achieves a combination of the best advantages, namely easy formability and/or machinability in the inner wall member where it is important for forming the cooling channels, along with high tensile and bending strength in the outer jacket where it is important for withstanding the forces arising from the gas pressure in the combustion chamber and nozzle.

The outer jacket of the inventive wall construction is preferably made of anisotropic long-fibered two-dimensionally oriented (2D) C/SiC. Namely, the long carbon fibers are oriented in two dimensions or directions to achieve preferred anisotropic material properties. For example, the composite material forming the outer jacket may be built-up by winding or wrapping, or by pre-preg layers.

On the other hand, the inner wall member is preferably made of isotropic short-fiber C/SiC material (e.g. having non-oriented or randomly oriented fibers) that can be molded, pressed, and sintered as necessary into the required configuration, with little or no after-machining necessary, or can be formed into an intermediate semi-finished component into which the cooling channels may easily be milled or otherwise machined. It is also possible to first form the inner wall member as an intermediate body of carbon material, which may very easily be machined into the required finished shape, before silicon or a silicate or the like is infiltrated into the carbon fiber body and reacted to form silicon carbide. The use of short-fibered C/SiC for the inner wall member further achieves the following advantages: a monolithic lightweight construction; a very high and selectably adjustable strength and stiffness; a low density and low overall component weight; the ability to be pressed or otherwise formed in a simple manner to a near-finished shape in the green condition, for example by pressing or molding, or by machining such as turning; a high thermal shock resistance; a high thermal conductivity; a low thermal expansion coefficient; a high chemical resistance; no creeping or essentially no creeping under mechanical load; relatively low raw material costs; and low production costs.

BRIEF DESCRIPTION OF THE DRAWINGS

In order that the invention may be clearly understood, it will now be described in connection with example embodiments, with reference to the accompanying drawings, wherein:

FIG. 3A is a schematic cross-sectional diagram of a portion of a prior art wall construction for a combustion chamber indicating the temperatures present at various planes in the structure for a typical operating example;

FIG. 3B is a schematic sectional view similar to that of FIG. 3A, but showing a wall construction according to the invention with the temperatures prevailing at different planes in the wall construction for the same typical operating example; and FIG. 4 is a schematic sectional view of a combustion chamber and a thrust nozzle of a high power engine, comprising a wall construction according to the invention.

Figure 1:
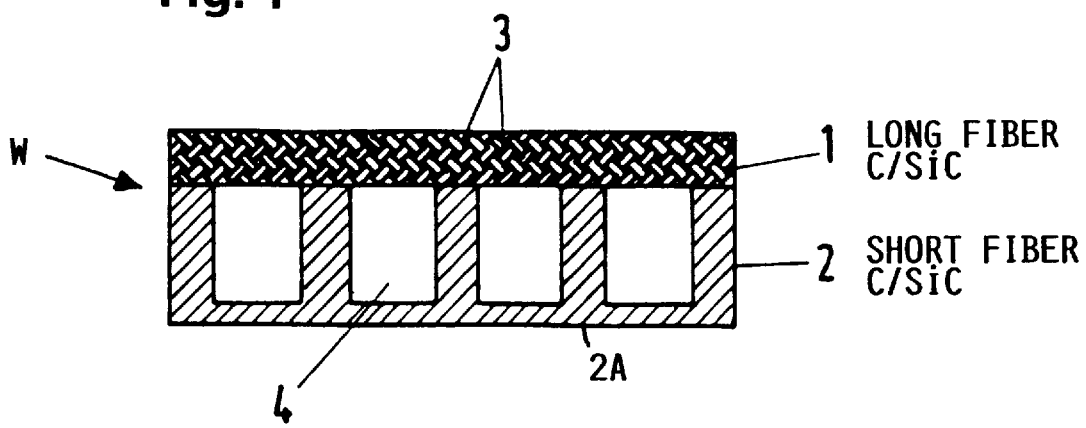
FIG. 1 is a schematic sectional view of a broken portion of a wall construction for a combustion chamber according to the invention, in the finished condition ready for operation.

DETAILED DESCRIPTION OF PREFERRED EXAMPLE EMBODIMENTS AND OF THE BEST MODE OF THE INVENTION

An example embodiment of a wall construction W for a combustion chamber and/or a thrust nozzle of a high powered engine, for example a rocket engine, is shown merely schematically in the drawings. As shown in the drawings, the wall construction W can be an essentially flat planar wall for a combustion chamber or thrust nozzle having a quadrilateral cross-section, but may alternatively be adapted to have a curved or circular configuration for a combustion chamber or thrust nozzle having a corresponding curved or circular cross-section. FIG. 4 schematically represents a high power engine, comprising a combustion chamber 8 and a thrust nozzle 9 including a constricted throat 10, which are all bounded by a wall construction W according to the invention. Auxiliary components of the engine, such as fuel and oxidizer lines, turbo-pumps, fuel injectors, gasifiers, and the like that are conventional in the art have been omitted from this merely schematic representation.

In each of the drawing figures, the wall construction W includes an outer jacket 1 which takes up and supports all of the mechanical loads arising in the combustion chamber and/or thrust nozzle. The outer jacket 1 consists of an anisotropic long-fiber C/Sic composite material, for example preferably a long-fiber 2D-C/SiC composite material which may be built-up by winding or wrapping filaments, fibers or rovings 3 of the material to form the overall required thickness of the outer jacket 1. Alternatively, the outer jacket 1 may be provided in the form of a pre-preg layer or a multi-layered sheet, in which the fibers may be woven or non-woven with the desired orientation to achieve the required anisotropic characteristics for any particular application.

The wall construction W further comprises an inner wall member 2 which faces and bounds the inner combustion space of the combustion chamber, for example having an inner surface 2A that directly bounds and contacts the hot combustion gases within the combustion chamber and/or the thrust nozzle. The inner wall member 2 is made of an isotropic short fiber C/SiC composite material which may easily be formed or mechanically machined into the required configuration, for example including a plurality of cooling channels 4 provided therein for providing the necessary cooling function. For example, the cooling channels 4 may simply be milled into a sheet or plate of the isotropic short-fiber C/SiC material to form the inner wall member 2.

Figure 2A:
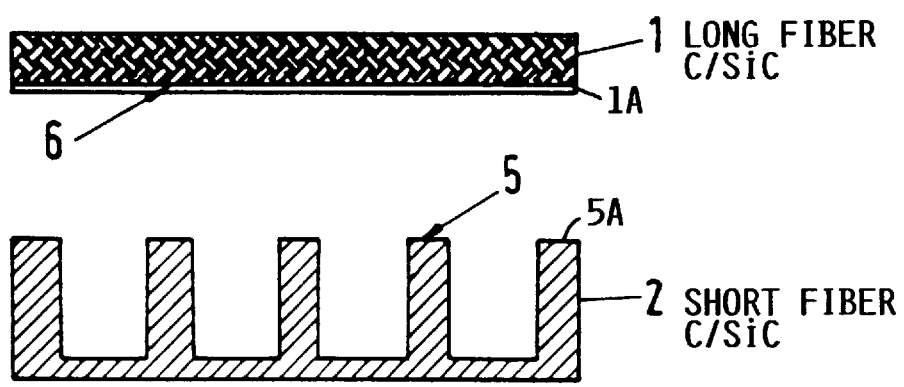
FIG. 2A is a schematic view illustrating a step in manufacturing the wall construction according to FIG. 2.
Figure 2B:
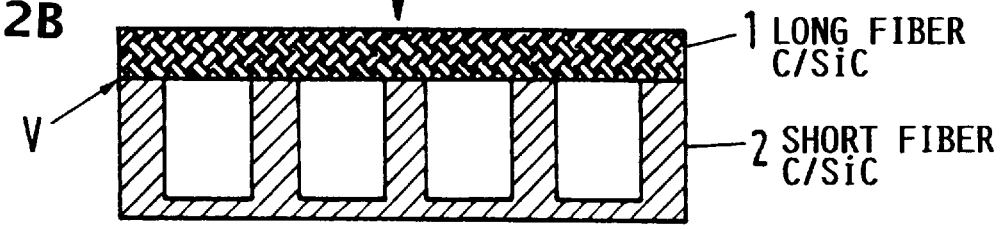
FIG. 2B is a schematic view illustrating a subsequent manufacturing step following the step illustrated in FIG. 2A.

A sequence of steps for assembling the outer jacket 1 onto the inner wall member 2 is shown in FIGS. 2A and 2B. An alternative assembly method could involve winding or laying-up the outer jacket 1 "in situ" onto the inner wall member 2. FIG. 2A shows the outer jacket 1 and the inner wall member 2 separate from each other, whereby each of these components has been previously independently fabricated. In order to bond the two components strongly and substantially integrally to each other, a layer 6 of $Cr_2O_3$ or $Al_2O_3$ is applied onto an inner surface 1A of the outer jacket 1 which faces the inner wall member 2. Similarly, an SiC layer 5 is provided, preferably by chemical vapor deposition (CVD), onto the outwardly facing surfaces 5A of the inner wall member 2. More particularly, these outer surfaces 5A are the surfaces of the inner wall member 2 that will be bonded to the outer jacket 1 in the areas of the upper surface of the inner wall member 2 remaining after formation of the cooling channels 4.

After the components have been prepared with the bonding layers as described above in connection with FIG. 2A, the two components are pressed together and fired as necessary to bond the outer jacket 1 onto the inner wall member 2 so as to prepare the finished wall construction W. By this process, a ceramic soldering or welding joint interface layer V is formed in a form-fitting and integrally bonding manner between the two components, whereby the $Cr_2O_3$ or $Al_2O_3$ of the layer 6 and the SiC of the layer 5 react with each other to form an integrally bonding silicate (for example, $Al_2O_3$ +SiC→aluminum silicate) that forms the joint interface layer V.

Figure 2C:
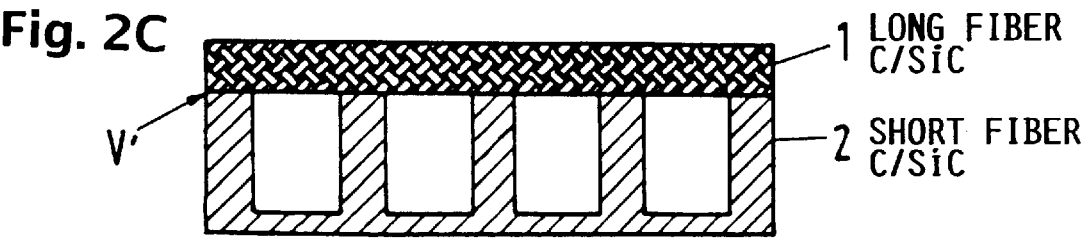
FIG. 2C is a schematic view similar to that of FIG. 2B, but illustrating a variant process embodiment.

FIG. 2C represents a process variant without the ceramic solder joint layer v as described above in connection with FIG. 2B. Instead, in the process of FIG. 2C, the outer jacket 1 and the upper surface SA of the inner wall member 2, at the areas of the wall member 2 coming into contact with the outer jacket 1, are bonded to each other by means of simultaneous infiltration of silicon into the short fiber material of the inner wall member 2 and the long fiber material of the outer jacket 1. The silicon being infiltrated into the materials of the two components forms a form-fitting and integrally bonding joint layer V', which for example comprises silicon carbide and/or silicates.

The advantageous mechanical and thermal properties of the wall construction w according to the invention will now be compared to the corresponding properties of a conventional or prior art wall construction W' in connection with FIGS. 3B and 3A respectively. Namely, FIG. 3A shows a conventional wall construction of a combustion chamber, with an integral structure comprising metal such as Cu. Ag and/or Zr, while FIG. 3B shows the wall construction W according to the invention comprising an outer jacket 1 of long-fibered C/SiC and an inner wall member 2 of short-fibered C/SiC integrally bonded to each other at a joint layer V. The conventional wall construction W' shown in FIG. 3A as well as the inventive wall construction W shown in FIG. 3B both are adapted for a regenerative cooling using liquid hydrogen flowing through cooling channels 4 provided in the wall construction, to protect the wall construction from the extremely high temperatures prevailing in the combustion chamber of the high power engine.

In both cases, the wall constructions W and W' have an inner surface 2A exposed to the combustion gases and thus exposed to the extremely high temperatures. Both cases assume the same heat transfer conditions respectively between the hot combustion gas and the inner surface 2A of the wall construction W or W', and between the hot parts of the wall construction and the liquid hydrogen cooling medium flowing in the cooling channels 4. These thermal transfer conditions generally or approximately correspond to the thermal load conditions that arise in a typical high power engine burning hydrogen and oxygen with combustion chamber pressures of over 220 bar as peak values in the throat of the thrust nozzle. Namely, an extremely high thermal loading of the combustion chamber wall of approximately 120 MW/m$^2$ has been used as a peak value which can arise locally for such an engine and such operating conditions.

Although the same initial thermal loading conditions are used in the prior art example of FIG. 3A and the inventive example of FIG. 3B, different temperature conditions prevail at specified locations in the two wall constructions, due to the different thermal conductivities of the inventive ceramic composite wall material as compared to the conventional metallic wall material.

The conventional wall construction shown in FIG. 3A has a temperature of 800 K at the inner surface 2A facing the combustion chamber, a temperature of 500 K at the surface facing the cooling channels 4, a coolant medium temperature of 100 K, and also a completely-cooled average temperature of 100 K in the outer jacket member. As a result, it can be seen that the average temperature of the inner wall member between the cooling channels and the inner surface 2A is 650 K, with a temperature difference or gradient of $\Delta=300$ K in the inner wall member between the inner surface 2A and the surface facing the cooling channels, and a temperature difference of $\Delta=550$ K between the average temperature of the inner wall member (650 K) and that of the outer wall member (100 K).

On the other hand, in the inventive wall construction W shown in FIG. 3B has a temperature of 1239 K at the inner surface 2A facing the combustion chamber, a temperature of 435 K at the surface facing the cooling channels 4, a coolant medium temperature of 100 K, and also a completely-cooled average temperature of 100 K in the outer jacket member. As a result, it can be seen that the average temperature of the inner wall member between the cooling channels and the inner surface 2A is 837 K, with a temperature difference or gradient of $\Delta=804$ K in the inner wall member between the inner surface 2A and the surface facing the cooling channels, and a temperature difference of $\Delta=737$ K between the average temperature of the inner wall member (837 K) and that of the outer wall member (100 K).

As a result of the temperature values illustrated in FIGS. 3A and 3B, it appears that the components of the inventive wall construction W are subjected to a higher thermal loading with regard to the temperature differences prevailing across the wall construction and its components. In other words, a higher temperature gradient exists across the inventive wall construction W and its components when compared to the conventional wall construction. This is expected because the inner ceramic structure of the inventive wall construction W has a thermal conductivity which, at most, is only about ⅓ of the thermal conductivity provided by copper alloys that are typically used in the conventional wall construction.

Nonetheless a significant advantage is obtained by the invention, because the ceramic material in the inventive wall construction also has a substantially lower thermal expansion coefficient than the typical copper alloys or other metal alloys used in the conventional wall construction. As a result, the plastic deformation suffered by the inventive wall construction W is only half that suffered by the conventional wall construction W' under the same thermal loading conditions, i.e. as illustrated in FIGS. 3A and 3B.

More specifically, using the appropriate thermal expansion coefficients and the temperature data discussed above, the plastic deformation that will arise in the conventional wall construction W' due to the temperature gradients as illustrated in FIG. 3A can be calculated to obtain the following results:

a) plastic deformation resulting due to temperature gradient in inner wall=0.37%;
b) plastic deformation resulting due to temperature difference between inner and outer walls=1.33%;
c) total plastic deformation=1.70%.

On the other hand, for the inventive wall construction W shown in FIG. 3B, the arising plastic deformation values can be calculated as follows:

a) plastic deformation resulting due to temperature gradient in inner wall=0.30%;
b) plastic deformation resulting due to temperature difference between inner and outer walls=0.55%;
c) total plastic deformation=0.85%.

As can be seen, the total plastic deformation of the inventive wall construction W, namely 0.85%, is only half that of the conventional wall construction W', namely 1.70%, for the same operating conditions. As a result, a substantially increased operating life is achieved by the inventive combustion chamber wall construction made of C/SiC composite as compared to conventional metal wall structures, due to the sharply reduced plastic deformation, which leads to a reduced fatiguing of the wall construction during each thermal loading cycle. Thus, a much greater number of thermal loading cycles can be carried out before any cracking or other unacceptable defects or failures arise. Specifically, the inventive combustion chamber wall construction will achieve an increased operating life of at least ten times the operating life of a conventional combustion chamber wall construction consisting of copper alloys. Such an increase in the operating life makes the inventive wall construction suitable for use in reusable booster rocket engines and other reusable high power engines.

Moreover, in engines operating with a lower combustion chamber pressure, such as the known "Vulcan" engine, the thermal loads are reduced approximately by half. In such an application, the wall construction comprising a ceramic composite material according to the invention would only be subjected to deformations in or nearly in the elastic range. As a result, in such applications, the wall construction according to the invention would suffer essentially no degradation in its configuration or mechanical or operating properties even over a great number of operating cycles.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A wall construction for at least one of a combustion chamber and a thrust nozzle of a high power engine, comprising:
    an inner wall member that has a first side adapted to face toward an interior hot gas space of said at least one of a combustion chamber and a thrust nozzle, and a second side facing opposite said first side; and
    an outer jacket having a third side arranged on and connected to said second side of said inner wall member;
    wherein said inner wall member has a plurality of cooling channels extending therein, and comprises a short fiber C/Sic composite material containing relatively shorter fibers; and
    wherein said outer jacket comprises a long fiber C/SiC composite material containing relatively longer fibers as compared to said relatively shorter fibers of said short fiber C/SiC composite material.

2. The wall construction according to claim 1, particularly adapted as a wall construction for a combustion chamber and a thrust nozzle of a rocket engine of a flying body.

3. The wall construction according to claim 1, wherein said first side of said inner wall member is exposed as a bounding surface adapted to be directly exposed to and bounding said interior hot gas space.

4. The wall construction according to claim 1, wherein said inner wall member is a first unitary component essentially consisting of said short fiber C/SiC composite material, and said outer jacket is a second unitary component essentially consisting of said long fiber C/SiC composite material.

5. The wall construction according to claim 4, wherein said wall construction essentially consists of said inner wall member, said outer jacket, and an integral bonding layer interposed between said second side of said inner wall member and said third side of said outer jacket.

6. The wall construction according to claim 5, wherein said integral bonding layer comprises at least one silicate that integrally fuses and bonds together said short fiber C/SiC composite material of said inner wall member and said long fiber C/SiC composite material of said outer jacket.

7. The wall construction according to claim 6, wherein said bonding layer is a ceramic welding layer formed by respectively applying a first layer comprising at least one of $Cr_2O_3$ and $Al_2O_3$ and a second layer comprising SiC onto respective opposite ones of said second side and said third side, then pressing said second and third sides to each other with said first and second layers pressed therebetween, and heating said first and second layers, said inner wall member and said outer jacket.

8. The wall construction according to claim 1, wherein said wall construction further comprises an integral bonding layer interposed between said second side of said inner wall member and said third side of said outer jacket, and wherein said integral bonding layer comprises at least one silicate that integrally bonds together said short fiber C/SiC composite material of said inner wall member and said long fiber C/SiC composite material of said outer jacket.

9. The wall construction according to claim 5, wherein said integral bonding layer is such a layer as is formed by a process including applying a $Cr_2O_3$ layer onto said third side of said outer jacket before joining said second and third sides to each other.

10. The wall construction according to claim 5, wherein said integral bonding layer is such a layer as is formed by a process including applying an $Al_2O_3$ layer onto said third side of said outer jacket before joining said second and third sides to each other.

11. The wall construction according to claim 5, wherein said integral bonding layer is such a layer as is formed by a process including applying a SiC layer onto said second side of said inner wall member before joining said second and third sides to each other.

12. The wall construction according to claim 1, wherein said inner wall member and said outer jacket are integrally bonded to each other along said second and third sides adjoining each other, so as to form a monolithic body including said inner wall member and said outer jacket without gaps between said adjoining second and third sides.

13. The wall construction according to claim 1, having a flat planar configuration.

14. The wall construction according to claim 1, wherein said short fiber C/SiC composite is an isotropic composite and said long fiber C/SiC composite is an anisotropic composite.

15. The wall construction according to claim 14, wherein said fibers of said long fiber C/SiC composite are oriented in two dimensions.

16. The wall construction according to claim 1, wherein said long fiber C/SIC composite of said outer jacket is built up by winding to form said outer jacket.

17. The wall construction according to claim 1, wherein said long fiber C/SiC composite of said outer jacket is built up from prepreg layers to form said outer jacket.

18. The wall construction according to claim 1, wherein said cooling channels comprise grooves in said second side of said inner wall member, and said outer jacket covers a respective open side of each of said grooves along said second side of said inner wall.

19. A rocket engine comprising a combustion chamber and a thrust nozzle communicating with said combustion chamber, with an interior hot gas space inside said combustion chamber and said thrust nozzle, wherein said combustion chamber and said thrust nozzle both comprise a wall construction according to claim 1, bounding said interior hot gas space.

* * * * *